(12) United States Patent
Olesinski et al.

(10) Patent No.: US 8,385,358 B2
(45) Date of Patent: Feb. 26, 2013

(54) SIMPLE LOW-JITTER SCHEDULER

(75) Inventors: Wladyslaw Olesinski, Sunnyvale, CA (US); Hans Eberle, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 260 days.

(21) Appl. No.: 12/982,585

(22) Filed: Dec. 30, 2010

(65) Prior Publication Data

US 2012/0170459 A1    Jul. 5, 2012

(51) Int. Cl.
*H04L 12/56* (2006.01)
(52) U.S. Cl. ...................................................... 370/412
(58) Field of Classification Search .................... None
See application file for complete search history.

(56) References Cited

U.S. PATENT DOCUMENTS

| | | | |
|---|---|---|---|
| 2001/0009552 A1* | 7/2001 | Parruck et al. | 370/412 |
| 2007/0297435 A1* | 12/2007 | Bucknell et al. | 370/412 |
| 2011/0182299 A1* | 7/2011 | Loeb et al. | 370/412 |
| 2012/0002678 A1* | 1/2012 | Jonsson et al. | 370/412 |

OTHER PUBLICATIONS

Shreedhar, M., et al, "Efficient Fair Queuing Using Deficit Round-Robin", IEEE/ACM Transactions on Networking, vol. 4, No. 3, Jun. 1, 1996, 11 pages.
Parekh, A., et al, "A Generalized Processor Sharing Approach to Flow Control in Integrated Services Networks: The Single-Node Case", IEEE/ACM Transactions on Networking, vol. 1, No. 3, Jun. 1, 1993, 14 pages.
Chuanxiong, G., "SRR: An O(1) Time Complexity Packet Scheduler for Flows in Multi-Service Packet Networks", SIGCOMM'01, Aug. 27, 2001, 12 pages.
Demers, A., et al. "Analysis and Simulation of a Fair Queueing Algorithm", Internetworking: Research and Experience, vol. 1, 3-26, Jan. 1, 1990, 24 pages.

* cited by examiner

*Primary Examiner* — Gregory Sefcheck
*Assistant Examiner* — Amar Persaud
(74) *Attorney, Agent, or Firm* — Osha • Liang LLP

(57) ABSTRACT

A method for managing packets, including identifying a first packet source having a first weight and second packet source having a second weight, where the first weight exceeds the second weight; assembling a first regular subsequence of packets using a first packet from the second packet source and a first set of packets from the first packet source having a cardinality equal to a first weight ratio; assembling a first augmented subsequence of packets using a second packet from the second packet source and a second set of packets from the first packet source having a cardinality equal to the first weight ratio plus one; and forwarding a first sequence of packets including a first set of regular subsequences, which includes the first regular subsequence, and a first set of augmented subsequences, which includes the first augmented subsequence and has a cardinality based on the first augmented subsequence factor.

20 Claims, 9 Drawing Sheets

$W_i=10, W_j=4$

Counter/Register Values:
 WRR = floor($W_i/W_j$) = 2
 RR = $W_i - W_j \times$ WRR = 10 − 4 × 2 = 2
 ASRR = floor($W_j$/RR) = 2
 ASCC = ceil($W_i$/(WRR × ASRR + WRR + 1)) = ceil(10/(4 + 2 + 1)) = ceil(10/7) = 2

SEQUENCE: I I J I I I J I I I J I I J

Augmented     Regular
                Subsequence  Subsequence

Inter Departure Delays for Flow i: 1,2,1,1,2,1,1,2,1,2
Inter Departure Delays for Flow j: 4,4,3,3
Jitter of Flow i = 0.49      Jitter of Flow j = 0.50

I = Packet from Flow i
J = Packet from Flow j

Example 1
610

---

$W_i=10, W_j=4$

Counter/Register Values:
 WRR = floor($W_i/W_j$) = 2
 RR = $W_i - W_j \times$ WRR = 10 − 4 × 2 = 2
 ASRR = floor($W_j$/RR) = 2
 ASCC = floor($W_i$/RR) = 2

SEQUENCE: I I J I I I J I I I J I I J I

Pattern of
             subsequences

Inter Departure Delays for Flow i: 1,2,1,2,1,1,2,1,2,1
Inter Departure Delays for Flow j: 3,4,3,4
Jitter of Flow i = 0.49      Jitter of Flow j = 0.50

I = Packet from Flow i
J = Packet from Flow j

Example 2
620

First Sequence: P1 P1 P2 P1 P1 P2 P1 P1 P2 P1 P1 P2
SRF: 1, 1, 2, 1, 1, 1, 2, 1, 1, 2
TWR = $W_1 + W_2 = 10$ Counter/Register Values:
 WRR = floor(TWR/$W_3$) = 2
 RR = TWR − $W_3$ × WRR = 10 − 5 × 2 = 0
 ASRR = 0
 ASCC = 0

P1 = Packet from Flow 1
P2 = Packet from Flow 2
P3 = Packet from Flow 3

FINAL SEQUENCE: P1 P1 P3 P2 P1 P3 P1 P1 P3 P2 P1 P3 P1 P2 P3

FIG. 8

SIMPLE LOW-JITTER SCHEDULER

BACKGROUND

Network-on-Chip (NoC) is a model for communications within systems implemented on a single chip (e.g., a silicon chip). In a NoC system, multiple devices such as processor cores, memories, IO devices, and specialized logic blocks exchange data (e.g., data packets) using a network. A switched NoC is constructed from multiple point-to-point data links interconnected by switches, such that the data packets can be relayed from any source device to any destination device over several data links, by way of specific routing decisions at the switches.

When packets from two or more sources arrive at a switch, a scheduler embedded in the switch decides how the packets will be forwarded. Each packet source may require a certain Quality of Service (QoS), such as a minimum bandwidth, maximum latency, or maximum jitter, to properly send information (e.g., low latency is needed to for IP telephony). To guarantee a certain QoS for each packet source, various scheduling algorithms based on timestamp or round-robin methods have been developed. They offer algorithmic complexities ranging from constant to linear, with varying delay bounds, jitter, and fairness.

Deficit round robin is an attractive scheduling algorithm because of its relatively low complexity, especially when compared with timestamp-based scheduling algorithms. However, deficit round robin can serve one packet source for a long time before it "switches" to another packet source. This results in high jitter since the delay between any two consecutive packets that are forwarded from one packet source may vary greatly, a consequence that is undesirable from a QoS perspective. Another scheme that generally provides lower jitter than deficit round robin is called smoothed round robin. Although relatively simple to implement in a high level programming language, this scheme relies on processing a matrix that stores the relative weights of the sources in its rows, and hence its hardware implementation is more difficult.

In order to achieve improved QoS on simple systems such as NoCs, a low-jitter scheduling algorithm must be designed that can be easily implemented in hardware.

SUMMARY OF INVENTION

In general, in one aspect, the invention relates to a method for transmitting packets. The method comprises: identifying a first plurality of packets from a first packet source having a first weight; identifying a second plurality of packets from a second packet source having a second weight, wherein the first weight exceeds the second weight; obtaining a first weight ratio based on the first weight and the second weight; obtaining a first augmented subsequence factor based on the first weight and the second weight; assembling a first regular subsequence of packets using a first packet from the second packet source and a first set of packets from the first packet source, wherein the first set of packets has a cardinality equal to the first weight ratio; assembling a first augmented subsequence of packets using a second packet from the second packet source and a second set of packets from the first packet source, wherein the second set of packets has a cardinality equal to the first weight ratio plus one; and forwarding a first sequence of packets comprising a first set of regular subsequences including the first regular subsequence and a first set of augmented subsequences including the first augmented subsequence, wherein the first set of augmented subsequences has a cardinality based on the first augmented subsequence factor.

In general, in one aspect, the invention relates to a non-transitory computer readable storage medium comprising instructions for managing packets. The instructions comprise functionality for: identifying a first plurality of packets from a first packet source having a first weight; identifying a second plurality of packets from a second packet source having a second weight, wherein the first weight exceeds the second weight; obtaining a first weight ratio based on the first weight and the second weight; obtaining a first augmented subsequence factor based on the first weight and the second weight; assembling a first regular subsequence of packets using a first packet from the second packet source and a first set of packets from the first packet source, wherein the first set of packets has a cardinality equal to the first weight ratio; assembling a first augmented subsequence of packets using a second packet from the second packet source and a second set of packets from the first packet source, wherein the second set of packets has a cardinality equal to the first weight ratio plus one; and forwarding a first sequence of packets comprising a first set of regular subsequences including the first regular subsequence and a first set of augmented subsequences including the first augmented subsequence, wherein the first set of augmented subsequences has a cardinality based on the first augmented subsequence factor.

In general, in one aspect, the invention relates to a system for managing packets. The system comprises: a first queue storing a plurality of packets from a first packet source with a first weight; a second queue storing a plurality of packets from a second packet source with a second weight, wherein the first weight exceeds the second weight; a weight ratio counter (WRC) configured to decrement in response to forwarding a packet from the first packet source; and a sequence assembler operatively connected to the first queue, the second queue, the WRC, a weight ratio register (WRR), and an augmented subsequence coefficient counter (ASCC), wherein the sequence assembler comprises functionality to: assemble a regular subsequence of packets using a first set of packets from the first queue and a first packet from the second queue, wherein the first set of packets has a cardinality equal to a value of the WRR; assemble an augmented subsequence of packets using a second packet from the second queue and a second set of packets from the first queue, wherein the second set of packets has a cardinality equal to the value of the WRR plus one; and forward a sequence of packets comprising a set of regular subsequences including the regular subsequence and a set of augmented subsequences including the augmented sequence, wherein the set of augmented subsequences has a cardinality based on the ASCC, wherein the WRR is configured to restore the WRC to the value of the WRR before forwarding the regular subsequence and to restore the WRC to the WRR plus one before forwarding the augmented subsequence.

Other aspects of the invention will be apparent from the following description and the appended claims.

BRIEF DESCRIPTION OF DRAWINGS

FIG. 6 shows examples in accordance with one or more embodiments of the invention.

FIG. 8 shows examples in accordance with one or more embodiments of the invention.

DETAILED DESCRIPTION

Figure 1:
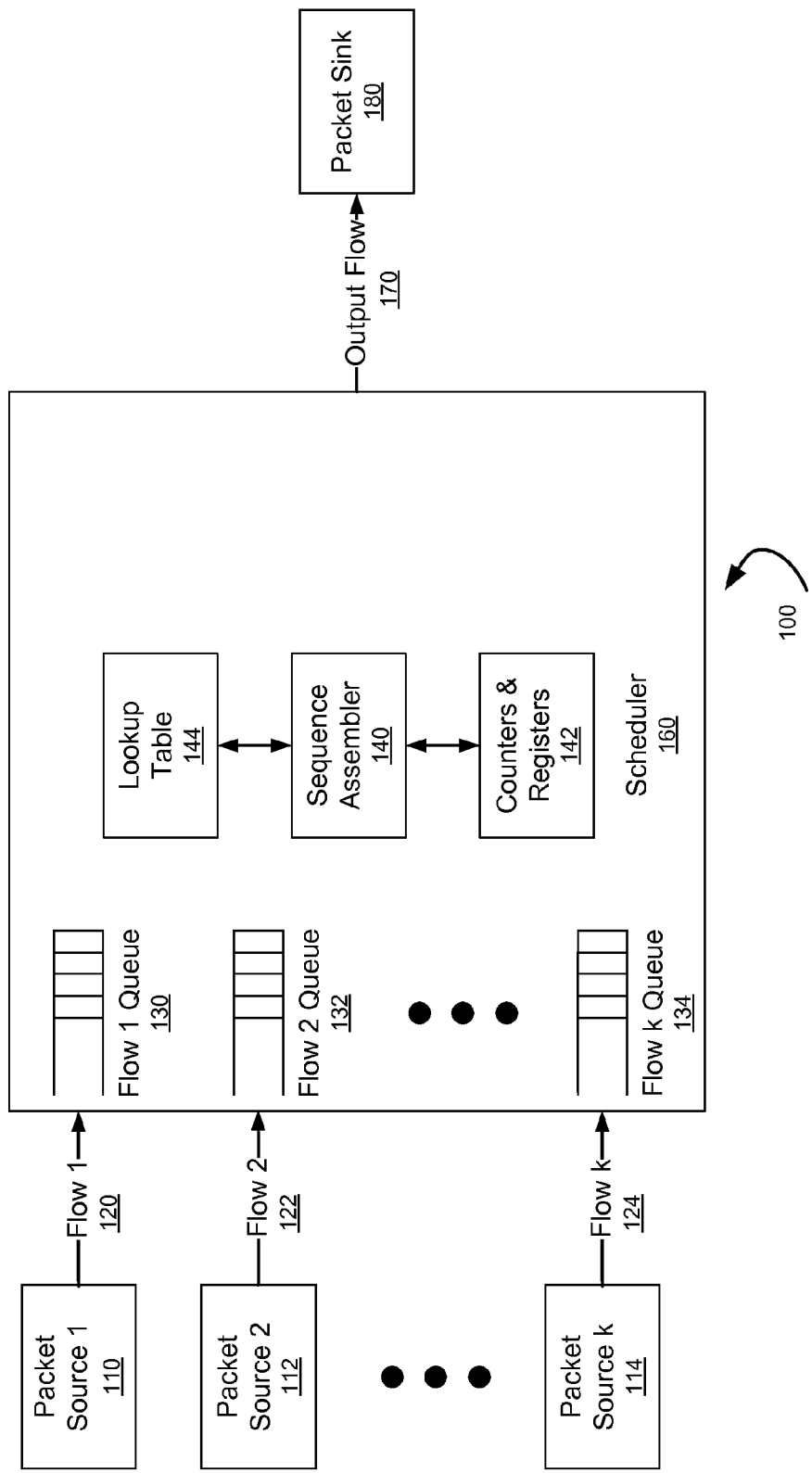
FIG. 1 shows a system having multiple components in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for managing packets (e.g., data packets, control packets) from two or more packet sources (e.g., streaming media, IP telephony, file transfer) with potentially different pre-assigned bandwidth allocations (i.e., weights). The scheduler receives as input a flow of packets from each packet source and outputs (i.e., forwards) a single flow of packets to a packet sink (e.g., switch, network interface card, NoC) according to a scheduling algorithm implemented by the scheduler. The scheduler includes multiple counters and registers for determining when to alternate between forwarding packets from one source and forwarding packets from another source. In one or more embodiments of the invention, the scheduling algorithm produces low-jitter scheduling for the packet sources while still adhering to each packet source's bandwidth allocation (i.e., weight). The scheduler may be part of a switched NoC architecture (i.e., the switches and the devices may be located on a single chip).

FIG. 1 shows a system (100) in accordance with one or more embodiments of the invention. As shown in FIG. 1, the system (100) has multiple packet sources (i.e., Packet Source 1 (110), Packet Source 2 (112), Packet Source k (114)). Each packet source generates a flow of packets (i.e., Flow 1 (120), Flow 2 (122), Flow k (124)) that arrives at a scheduler (160). The scheduler forwards the packets, generating an Output Flow (170) to a Packet Sink (180).

Each packet source (110, 112, 114) and its corresponding flow (120, 122, 124) may have a certain priority (i.e., weight). The weight determines how often packets will be forwarded from the packet source and flow in question. For example, if Flow 1 (120) has a weight of three and Flow 2 (122) has a weight of one, then three packets from Flow 1 (120) will be forwarded for every one packet of Flow 2 (122). Each weight may depend on the type of packet source (120, 122, 124), with some packet sources possibly having higher weight than others.

In one or more embodiments of the invention, the scheduler (160) has multiple components including multiple queues (i.e., Flow 1 Queue (130), Flow 2 Queue (132), Flow k Queue (134)), a sequence assembler (140), counters and registers (142), and a lookup table (144). In one or more embodiments of the invention, the lookup table (144) and the counters and registers (142) are part of the sequence assembler (140). Further, the queues (130, 132, 134), the sequence assembler (140), the counters and registers (142), and the lookup table (144) may each be implemented in any combination of hardware or software. Each component of the scheduler (160) is discussed below.

In one or more embodiments of the invention, the queues (130, 132, 134) include any combination of hardware (e.g., multiplexers, flip flops, registers, transistors, integrated circuits, random-access memory (RAM), etc.) and software components (e.g., an instruction set executing on a hardware component). The queues are used to temporarily store (i.e., buffer) incoming packets from the flows (120, 122, 124). In one or more embodiments of the invention, the queues (130, 132, 134) are located outside the scheduler (160) (i.e., external to the scheduler (160)).

In one or more embodiments of the invention, the Packet Sink (180) is a second scheduler (not shown). Accordingly, the Output Flow (170) from the first scheduler may be one of multiple incoming flows to the second scheduler, which effectively schedules the Output Flow (170) with the multiple incoming flows to the second scheduler.

In one or more embodiments of the invention, the counters and registers (142) and the lookup table (144) include any combination of hardware (e.g., multiplexers, flip flops, transistors, integrated circuits, (RAM), etc.) and software components (e.g., an instruction set executing on a hardware component). The counter and registers (142) may store and modify values used by the sequence assembler (140). The lookup table (144) stores values that may be accessed by the sequence assembler (140).

In one or more embodiments of the invention, the sequence assembler (140) includes any combination of hardware (e.g., multiplexers, flip flops, registers, lookup tables, transistors, processors, integrated circuits, RAM, etc.) and software components (e.g., an instruction set executing on a hardware component). The sequence assembler (140) is configured to assemble a sequence of packets according to a scheduling algorithm. The scheduling algorithm determines the sequence of packets from each flow queue (130, 132, 134) to be forwarded (i.e., outputted) to the packet sink (180). In one or more embodiments of the invention, the sequence of packets may be temporarily stored (i.e., buffered) in an output queue (not shown) located either within the scheduler (160) or external to the scheduler (160). In one or more embodiments of the invention, the scheduler stores instructions dictating the order in which the packets from queues (130, 132, 134) are to be forwarded (i.e., the instructions are used to assemble the sequence of packets). In one or more embodiments of the invention, the scheduler (160) does not store a sequence of packets, but instead assembles the sequence of packets concurrently as the flows (120, 122, 124) arrive. The scheduling algorithm may be implemented in software and executed on the sequence assembler (140). Alternatively, the sequence assembler (140) may include a hardware implementation of the scheduling algorithm.

Figure 2:
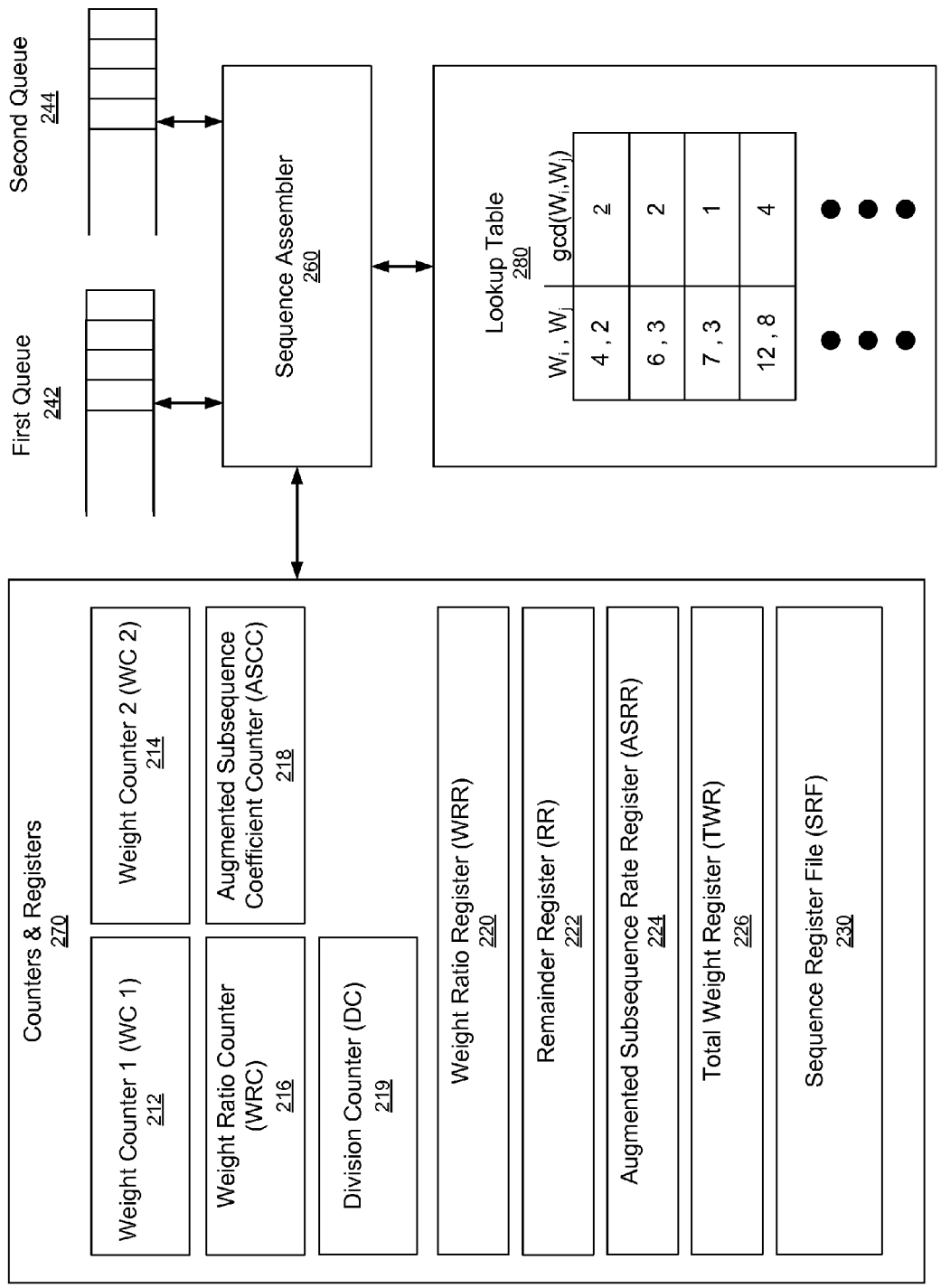
FIG. 2 shows one or more components of the system in FIG. 1, in accordance with one or more embodiments of the invention.

FIG. 2. shows a sequence assembler (260), counters and registers (270), a lookup table (280), and two queues (242, 244) in accordance with one or more embodiments of the invention. The sequence assembler (260), the counters and registers (270), and the lookup table (280) are essentially the same as those discussed above in reference to FIG. 1. The first queue (242) and the second queue (244) may correspond to any two flow queues (120, 122, 124) discussed above in reference to FIG. 2. As shown in FIG. 2, the sequence assembler (260) is operatively connected to the counters and registers (270), the lookup table (280), and the queues (242, 244).

As shown in FIG. 2, the counters and registers (270) include weight counter 1 (WC 1) (212), weight counter 2

(WC 2) (214), a weight ratio counter (WRC) (216), an augmented subsequence coefficient counter (ASCC) (218), a division counter (DC) (219), a weight ratio register (WRR) (220), a remainder register (RR) (222), an augmented subsequence rate register (ASRR) (224), a total weight register (TWR) (226), and a sequence register file (SRF) (230). FIG. 2 also shows a lookup table (280). The lookup table (280) stores the greatest common divisor (gcd) of predetermined values of two weights. The counters and registers (270) and the lookup table (280) are discussed below.

In one or more embodiments of the invention, the WC 1 (212) and WC 2 (214) are hardware counters, each corresponding to the weight of one of the flows (120, 122, 124) arriving at the scheduler (160). Further, WC 1 (212) may correspond to the weight (i.e., priority/bandwidth allocation) of the flow arriving at the first queue (242) and WC 2 (214) may correspond to the weight (i.e., priority/bandwidth allocation) of the flow arriving at the second queue (244). Accordingly, WC 1 (212) may correspond to Flow 1 (120) and Flow 1 Queue (130) may be the same as the first queue (242). Similarly, WC 2 (214) may correspond to Flow 2 (122) and Flow 2 Queue (132) may be the same as the second queue (244). Each weight counter (212, 214) is initially set to the weight (i.e., priority/bandwidth allocation) of the corresponding flow. In one or more embodiments of the invention, each weight counter is decremented every time the scheduler (160) forwards a packet from the corresponding flow. For example, WC 1 (212) may be initially set to the weight of Flow 1 (120) and decrements by one every time the scheduler (160) forwards (i.e., outputs) a packet from Flow 1 (120). In one or more embodiments of the invention, if one of the queues (242, 244) is empty, a packet is not forwarded but the corresponding counter (212, 214) is still decremented.

In one or more embodiments of the invention, a weight counter (212, 214) initially corresponds to one flow and later, as dictated by the scheduler (160), corresponds to a different flow (i.e., the weight counter switches flow associations). For example, WC 1 (212) may initially correspond to Flow 1 (120) and then, as dictated by the scheduler (160), switch and correspond to Flow k (124). Accordingly, the first queue (242) may now be the same as Flow k Queue (134). In one or more embodiments of the invention, the scheduler (160) assigns the flow with the larger weight (i.e., higher bandwidth allocation) to WC 1 (212), while the scheduler (160) assigns the flow with the smaller weight (i.e., lower bandwidth allocation) to WC 2 (214).

The scheduler (160) generates a sequence based on the two flows corresponding to WC 1 (212) and WC 2 (214) that are stored in the first queue (242) and the second queue (244). In the rest of this specification, the flow corresponding to WC 1 will be Flow i (not shown) having weight $W_i$ and will correspond to the first queue (242), while the flow corresponding to WC 2 will be Flow j (not shown), having weight $W_j$ and will correspond to the second queue (244). Further, $W_j$ is greater or equal to Those skilled in the art, having the benefit of this detailed description, will appreciate that Flow i and Flow j may be any of the flows chosen from Flow 1 (120) through Flow k (124).

In one or more embodiments of the invention, the WRC (216) is a hardware counter that decrements by one every time a packet from Flow i (212) is forwarded. Accordingly, every time WC 1 (212) is decremented by one, the WRC (216) is also decremented by one.

In one or more embodiments of the invention, the ASCC (218) is a hardware counter that decrements by one when a subsequence of packets is assembled. A subsequence of packets may be a section (i.e., subset or portion) of the sequence of packets forwarded by the scheduler (160) that includes at least one packet from Flow i and one packet from Flow j. In one or more embodiments of the invention, the subsequence is made up of packets stored in an internal queue (not shown). In one or more embodiments of the invention, the subsequence stores the order of packets in which the packets are to be forwarded. In one or more embodiments of the invention, the scheduler (160) does not store a subsequence of packets or a subsequence of instructions, but instead forwards the subsequence concurrently as the flows (120, 122, 124) arrive.

In one or more embodiments of the invention, the DC (219) is a hardware counter that is initially set to $W_j$ and is incremented by $W_j$ until the value of the DC is greater than $W_i$. For example, if $W_i$ is equal to 10 and $W_j$ is equal to 4, the DC (219) will increment twice to the values of 8 and 12, stopping at 12 as it is greater than 10. Those skilled in the art, having the benefit of this detailed description, will appreciate that the DC (219) increments a number of times equal to $\mathrm{floor}(W_i/W_j) = \lfloor W_i/W_j \rfloor$. Accordingly, the final value that the DC (219) stores is $W_j \times \mathrm{floor}(W_i/W_j)$. The DC (219) is further described below in reference to FIG. 3 and FIG. 5.

In one or more embodiments of the invention, the weight ratio register (WRR) (220) and the augmented subsequence rate register (ASRR) (224) are hardware registers that hold values for restoring the WRC (216) and ASCC (218), respectively. In other words, the registers (220, 224) may store the "old" or previous values of the corresponding counters (216, 218). In one or more embodiments of the invention, the registers (220, 224) are updated independently of the corresponding counters (216, 218). In one or more embodiments of the invention, the WRR (220) is set to $\mathrm{WRR} = \mathrm{floor}(W_i/W_j) = \lfloor W_i/W_j \rfloor$. In one or more embodiments of the invention, the remainder register (RR) (222) is a hardware register storing the value $RR = W_i - W_j \times WRR$. In one or more embodiments of the invention, the ASRR (222) is set to $\mathrm{ASRR} = \mathrm{floor}(W_j/RR) = \lfloor W_j/RR \rfloor$.

In one or more embodiments of the invention, the total weight register (TWR) (226) is a hardware register that stores a summation of the weights corresponding to all flows that have been scheduled by the scheduler. The sequence register file (SRF) (230) may be a hardware register file or any combination of hardware (e.g., multiplexers, flip flops, registers, lookup tables, transistors, processors, integrated circuits, RAM, etc.) and software components (e.g., an instruction set executing on a hardware component) that may store the instructions necessary to forward packets from flows (120, 122, 124) in a particular sequence as obtained by the scheduling algorithm. For example, the instructions may dictate the order in which the packets in queues (130, 132, 134) are to be popped and forwarded. In one or more embodiments of the invention, the TWR (226) stores the length of the sequence stored in the SRF (230).

Still referring to FIG. 2, the lookup table (280) stores the greatest common divisor (gcd) of several combinations of predetermined values of $W_i$ and $W_j$. For example, if $W_i$ equals 4 and $W_j$ equals 2, $\gcd(W_i, W_j) = \gcd(4,2) = 2$. As yet another example, if $W_i$ equals 12 and $W_j$ equals 8, $\gcd(12,8)=4$. Those skilled in the art, having the benefit of this detailed description, will appreciate that accessing the lookup table (280) requires less time and fewer resources than calculating the greatest common divisor of two numbers. Accordingly, by creating the lookup table (280) prior to running a process (i.e., the scheduling algorithm) requiring the greatest common divisor of two numbers, computational time and resources are saved.

Figure 3:
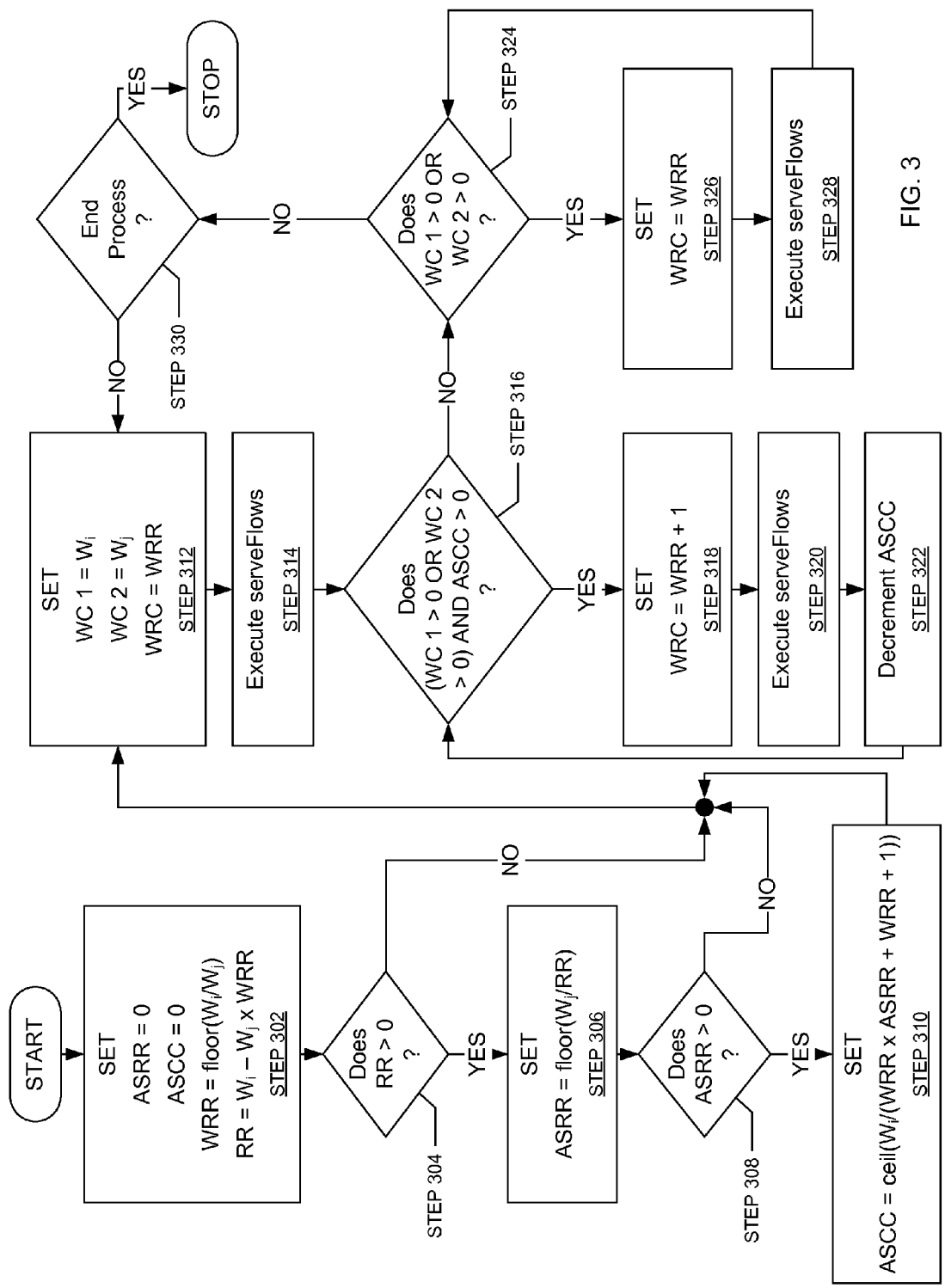
FIG. 3, FIG. 4, and FIG. 5 show flowcharts in accordance with one or more embodiments of the invention.

FIG. 3 shows a flowchart in accordance with one or more embodiments of the invention. The process shown in FIG. 3 may be a scheduling algorithm used by a scheduler (e.g., scheduler (160)) to assemble and forward a sequence of packets from Flow i having weight $W_i$ and Flow j having weight $W_j$. Further, the process shown in FIG. 3 may be implemented using one or more components of the system (100). Those skilled in the art, having the benefit of this detailed description, will appreciate that the sequence of steps shown in FIG. 3 may differ among embodiments of the invention, and that one or more of the steps shown in FIG. 3 may be repeated or omitted.

In one or more embodiments of the invention, the scheduling algorithm in FIG. 3 may set and modify the values of one or more counters (e.g., WC 1, WC 2, WRC, ASCC, DC). In one or more embodiments of the invention, the scheduling algorithm may store calculated values in registers (e.g., WRR, RR, ASRR, TWR) and register files (e.g., SRF). In one or more embodiments of the invention, a weight ratio is stored in the WRR.

Initially, the values of the ASRR and the values of the ASCC are reset to zero (STEP 302). Further, the value of the WRR is set to WRR=floor($W_i/W_j$)=$\lfloor W_i/W_j \rfloor$. The result of $\lfloor W_i/W_j \rfloor$ may be referred to as a weight ratio. The value of the RR is set to RR=$W_i-W_j \times$WRR. The result of $W_i-W_j \times$WRR may be referred to as an augmented subsequence factor. As discussed above in reference to FIG. 2, the DC may effectively store the value $W_j \times$floor($W_i/W_j$)=$W_j \times$WRR after the DC stops incrementing. Accordingly, the DC may be used for calculating the value of the WRR and the value of the RR.

In STEP 304, the RR is read to determine whether the RR exceeds zero. When it is determined that the RR exceeds zero, the process proceeds to STEP 306. Otherwise, when it is determined that the RR does not exceed zero, the process proceeds to STEP 312. In STEP 306, the ASRR is set to ASRR=floor($W_j$/RR) and the process proceeds to STEP 308. In STEP 308, the ASRR is read to determine whether the ASRR exceeds zero. When it is determined that the ASRR exceeds zero, the process proceeds to STEP 310. Otherwise, when it is determined that the ASRR does not exceed zero, the process proceeds to STEP 312. In STEP 310, the ASCC is set to ASCC=ceil($W_i$/(WRR$\times$ASRR+WRR+1))=$\lceil W_i$/(WRR$\times$ASRR+WRR+1)$\rceil$, and the process proceeds to STEP 312. The result of $\lceil W_i$/(WRR$\times$ASRR+WRR+1)$\rceil$ may also be referred to as an augmented subsequence factor. Those skilled in the art, having the benefit of this detailed description, will appreciate that STEP 304 exists to prevent a division by zero in STEP 306. In one or more embodiments of the invention, an augmented subsequence factor is stored in the ASCC.

In STEP 312, the remaining counters WC 1, WC 2, and the WRC are set to their initial values. Accordingly, WC 1 is set to WC 1=$W_i$, WC 2 is set to WC 2=$W_j$, and the WRC is set to WRC=WRR.

In STEP 314, a procedure serveFlows is executed, which assembles and forwards a regular subsequence of packets. A regular subsequence contains a number of packets from Flow i equal to the value of the WRR and one packet from Flow j. The serveFlows procedure may read and modify counters WC 1, WC 2, and WRC. The serveFlows procedure is further described below in reference to FIG. 4.

In STEP 316, the ASCC, WC 1, and WC 2 are read to determine if the ASCC exceeds 0 and whether at least one of WC 1 and WC 2 exceeds zero. When it is determined that all conditions of STEP 316 are true, the process proceeds to STEP 318. Otherwise, when it is determined that at least one of the conditions in STEP 316 is false, the process proceeds to STEP 324.

In STEP 318, the value of the WRC is restored to WRC=WRR+1. As discussed above, serveFlows may modify WRC in STEP 314. In STEP 320, serveFlows is executed and an augmented subsequence is assembled and forwarded. An augmented subsequence contains a number of packets from Flow i equal to the value of WRR augmented by one (i.e., WRR+1) and one packet from Flow j. In response to assembling and forwarding an augmented subsequence, the ASCC is decremented by one (STEP 322). After STEP 322, the process returns to 316. Those skilled in the art, having the benefit of this detailed description, will appreciate that the process of FIG. 3 continuously repeats STEP 318, STEP 320, and STEP 322 until at least one of the conditions set forth in STEP 316 is false, effectively assembling and forwarding a set of augmented subsequences. Accordingly, the set of augmented subsequences assembled and forwarded has a cardinality that depends on the values of WC 1, WC 2, and the ASCC. In one of more embodiments of the invention, the number of augmented subsequences assembled and forwarded is equal to the initial value of the ASCC as set in STEP 310.

In STEP 324, WC 1 and WC 2 are read to determine whether at least one of WC 1 and WC 2 exceeds zero. When it is determined that at least one of WC 1 and WC 2 exceeds zero, the process proceeds to STEP 326. Otherwise, when it is determined that both WC 1 and WC 2 do not exceed zero, the process proceeds to STEP 330.

In STEP 326, the value of the WRC is restored to WRC=WRR. In STEP 328, serveFlows is executed and a regular subsequence is assembled and forwarded. Those skilled in the art, having the benefit of this detailed description, will appreciate that the process of FIG. 3 continuously repeats STEP 326 and STEP 328 until the condition set forth in STEP 324 is false, effectively assembling and forwarding a set of regular subsequences. Accordingly, the set of regular subsequences assembled and forwarded has a cardinality that depends on the values of WC 1 and WC 2.

After STEP 324, the process returns to STEP 312. Alternatively, execution of the process may be ended (e.g., by a user) (i.e., STEP 330). In one or more embodiments of the invention, STEP 330 is omitted. In such embodiments, STEP 312 is immediately executed following STEP 324.

Those skilled in the art, having the benefit of this detailed description, will appreciate that the length of the sequence forwarded is equal $W_i+W_j$. Further, the sequence may be composed of $W_i$ packets from Flow i and $W_j$ packets from Flow j. Those skilled in the art, having the benefit of this detailed description, will appreciate that the last time serveFlows executes in STEP 326 before the condition set forth in STEP 324 is false, the subsequence serveFlows forwards may be different from a regular subsequence or an augmented subsequence because of the constraints imposed on the length and composition of the sequence, as discussed above.

In one or more embodiments of the invention, the jitter of a flow may be calculated from inter departure delays of each packet from each flow in the resulting sequence of packets. The inter departure delay of a packet from Flow i is equal to number of positions in the sequence before the next packet from Flow i. Likewise, the inter departure delay of a packet from Flow j is equal to the number of positions in the sequence before the next packet from Flow j. A calculation of the inter departure delays is performed on each packet from the resulting sequence with a copy of the same sequence appended to the back of the original sequence. For the sequence $I_1 I_2 J_1 I_3 I_4 I_5 J_2 I_6 I_7 I_8 J_3 I_9 I_{10} J_4$ (i.e., $I_N$=Nth packet from Flow i and $J_N$=Nth packet from Flow j), the inter departure delay calculation will be performed on $I_1 I_2 J_1 I_3 I_4 I_5 J_2 I_6 I_7 I_8 J_3 I_9 I_{10} J_4$–I I J I I I J I I I J I I J. For example, first packet from Flow i (i.e., $I_1$) is directly next to (i.e., one position away) from a next packet from Flow i (i.e., $I_2$), and hence the inter departure delay of the first packet from Flow i is one. In another example, the second packet from Flow i (i.e., $I_2$) is two positions away from the next packet from Flow i (i.e., $I_3$), and hence the inter departure delay of the second packet from Flow i is two. Accordingly, the inter departure delays of Flow i for the sequence are 1, 2, 1, 1, 2, 1, 1, 2, 1, and 2. The jitter of a flow in a sequence is obtained by calculating the standard deviation of its inter departure delays. Accordingly, the jitter of Flow i is 0.49, whereas the jitter of Flow j is 0.50.

The scheduling algorithm of FIG. 3 may schedule Flow i and Flow j in such a way as to achieve low jitter. Consider all permutations of two weights, $W_i$ and such that each weight is less than or equal to $W_{max}$. For example, if $W_{max}=2$, the permutations $(W_i, W_j)$ are (1, 1), (2, 1), (1, 2), and (2, 2). For $W_{max}=6$, the average jitter of all sequences assembled for all the permutations of weights according the scheduling algorithm in FIG. 3 is 1.15 times lower than the jitter of all sequences assembled by smoothed round robin (discussed above) and 4.55 times lower than the jitter of all sequences assembled by deficit round robin (discussed above). Similarly, for $W_{max}=100$, the average jitter for all sequences produced for all the permutations of weights according to the scheduling algorithm in FIG. 3 is approximately 1.5 times lower than the jitter of all sequences assembled by smoothed round robin and nearly 19 times lower than the jitter of all sequences assembled by deficit round robin. Thus, as discussed above, the scheduling algorithm in FIG. 3, in general, assembles sequences with a lower jitter than those sequences assembled by smoothed round robin and deficit round robin. Therefore, the scheduling algorithm of FIG. 3 may be preferable from a QoS perspective.

Figure 4:
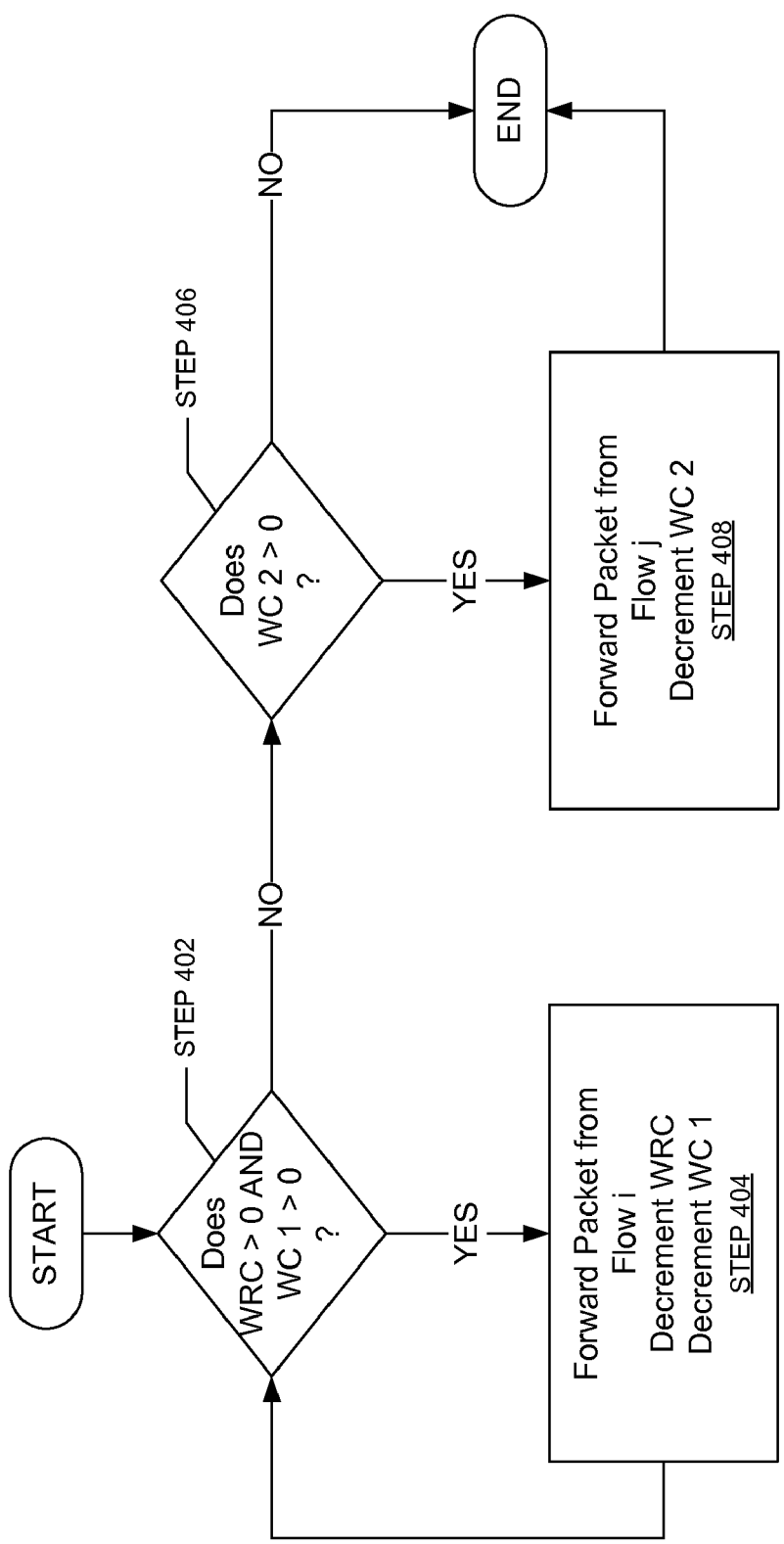

FIG. 4 shows a flowchart in accordance with one or more embodiments of the invention. The process shown in FIG. 4 may be part of a scheduling algorithm used by a scheduler to assemble and forward a regular subsequence or an augmented subsequence (e.g., procedure serveFlows in STEPS 314, 320, 328 in FIG. 3). Moreover, the process shown in FIG. 4 may access/read any of the counters and/or registers discussed above in reference to FIG. 2. Those skilled in the art, having the benefit of this detailed description, will appreciate that the sequence of steps shown in FIG. 4 may differ among embodiments of the invention, and that one or more of the steps shown in FIG. 4 may be repeated or omitted.

In STEP 402, the WRC and WC 1 are read to determine whether the WRC exceeds zero and WC 1 exceeds zero. When it is determined that all the conditions of STEP 402 are true, the process proceeds to STEP 404. Otherwise, when it is determined that at least one of the conditions in STEP 402 is false, the process proceeds to STEP 406. In STEP 404, one packet from Flow i is forwarded. In response, the WRC is decremented by one and WC 1 is decremented by one. After STEP 404, the process returns to STEP 402. Those skilled in the art, having the benefit of this detailed description, will appreciate that the process of FIG. 4 continuously repeats STEP 404 until at least one condition set forth in STEP 402 is false. Accordingly, the number of packets forwarded from Flow i depends on the values of the WRC and WC 1.

In STEP 406, WC 2 is read to determine whether WC 2 exceeds zero. When it is determined that WC 2 exceeds zero, the process proceeds to STEP 408. Otherwise, when it is determined that WC 2 does not exceed zero, the process ends. In STEP 408, one packet from Flow j is forwarded. In response, WC 2 is decremented by one. After STEP 408, the process ends.

Those skilled in the art, having the benefit of this detailed description, will appreciate that as each packet is forwarded in STEP 404 and STEP 408, the packet may instead be placed in an internal queue to be forwarded at a later time, effectively assembling a subsequence of packets. Further, each time a packet is forwarded, instructions identifying the flow queue (130, 132, 134) from which the packet originated may be stored in the SRF, effectively assembling a sequence of instructions corresponding to the order in which the packets in the flow queues (130, 132, 134) are to be forwarded. In one or more embodiments of the invention, STEP 406 and STEP 408 may precede STEP 402 and STEP 404. In other words, a packet from Flow j may be forwarded before a packet from Flow i is forwarded.

In one or more embodiments of the invention, when at least one of Flow i or Flow j does not contain packets to be forwarded (e.g., the queue corresponding to the flow is empty or the corresponding packet source stops sending packets), the scheduling algorithm temporarily suspends computation (i.e., remain in one of the steps in FIG. 4 without advancing to the next step) and retains all stored values (e.g., WC 1, WC 2, WRC, ASCC, DC, WRR, RR, ASRR, TWR, and SRF). The scheduler may resume computation once both Flow i and Flow j have packets to be forwarded. For example, if Flow i contains no packets to be forwarded, the process may be suspended in STEP 404. Once a packet from Flow i becomes available, the process may resume and proceed to STEP 402, as discussed above. In other words, the scheduling algorithm waits for packets to become available from both flows before proceeding.

In one or more embodiments of the invention, the scheduling algorithm proceeds whether or not both Flow i and Flow j contain packets to be forwarded. For example, if Flow i contains no packets to be forwarded during STEP 404, the scheduling algorithm still decrements WRC and WC 1 and then proceeds to STEP 402. In other words, the scheduling algorithm skips the flow that does not contain packets to be forwarded.

Figure 5:
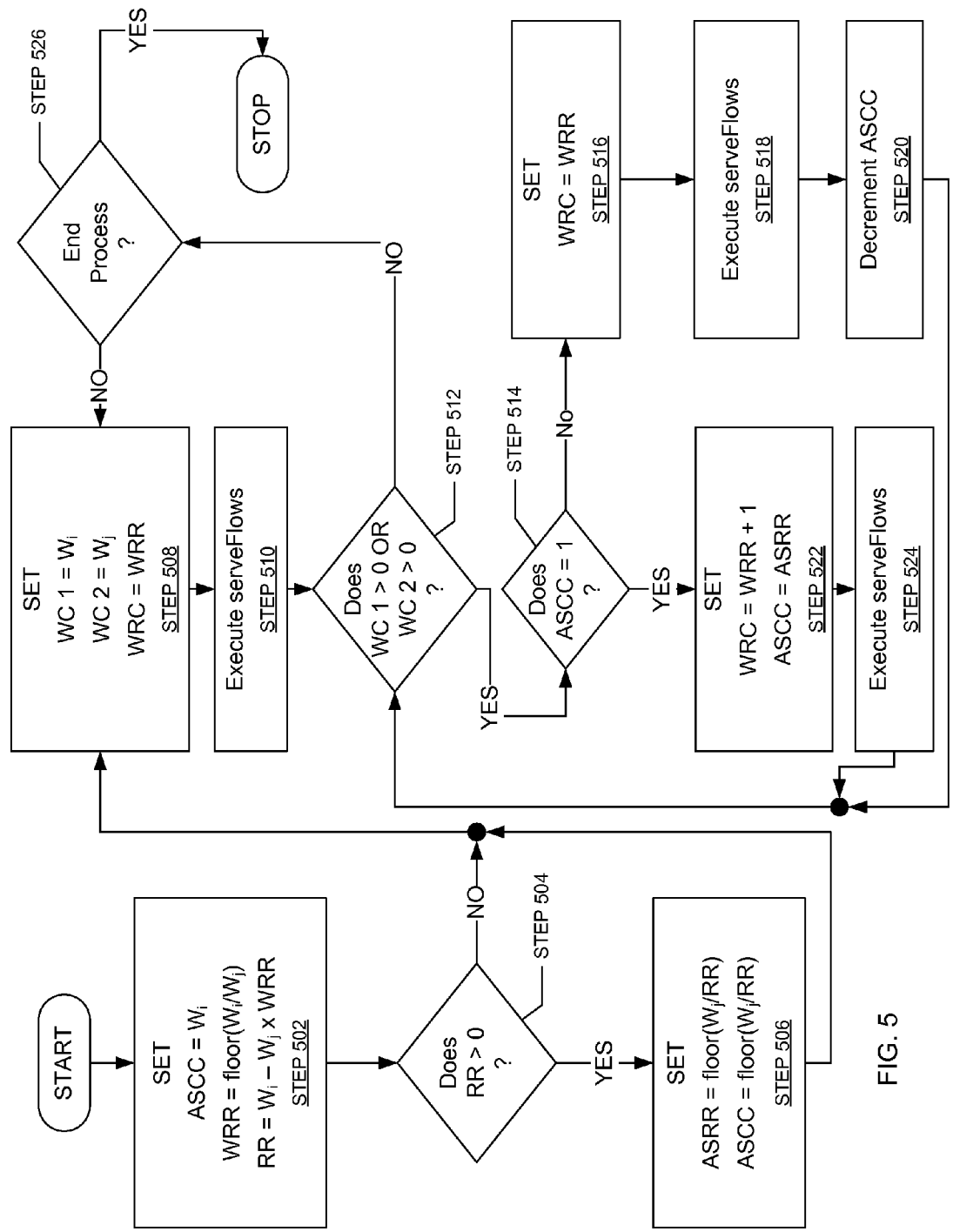

FIG. 5 shows a flowchart in accordance with one or more embodiments of the invention. The process shown in FIG. 5 may be another scheduling algorithm used by a scheduler to assemble and forward a sequence of packets from Flow i having weight $W_i$ and Flow j having weight $W_j$. Those skilled in the art, having the benefit of this detailed description, will appreciate that the sequence of steps shown in FIG. 5 may differ among embodiments of the invention, and that one or more of the steps shown in FIG. 5 may be repeated or omitted.

In one or more embodiments of the invention, the scheduling algorithm in FIG. 5 may set and modify the values of one or more counters (e.g., WC 1, WC 2, WRC, ASCC, DC). In one or more embodiments of the invention, the scheduling algorithm may store calculated values in registers (e.g., WRR, RR, ASRR, TWR) and register files (e.g., SRF). In one or more embodiments of the invention, a weight ratio is stored in the WRR.

Initially, the WRR is set to $WRR=floor(W_i/W_j)=\lfloor W_i/W_j \rfloor$. The result of $\lfloor W_i/W_j \rfloor$ may be referred to as a weight ratio. Further, the ASCC is set to $ASCC=W_i$ and the RR is set to $RR=W_i-W_j \times WRR$ (STEP 502). As discussed above in reference to FIG. 2, the DC may effectively store the value $W_j \times floor(W_i/W_j)=W_j \times WRR$ after the DC stops incrementing. Accordingly, the DC may be used for calculating the value of the WRR and the value of the RR.

In STEP 504, the RR is read to determine whether the RR exceeds zero. When it is determined that the RR exceeds zero, the process proceeds to STEP 506. Otherwise, when it is determined that the RR does not exceed zero, the process proceeds to STEP 508. In STEP 506, the ASRR is set to $ASRR=floor(W_j/RR)=\lfloor W_j/RR \rfloor$ and ASCC is also set to ASCC=floor($W_j$/RR)=$\lfloor W_j/RR \rfloor$. The result of $\lfloor W_j/RR \rfloor$ may be referred to as an augmented subsequence factor. After STEP 506, the process proceeds to STEP 508. In one or more embodiments of the invention, an augmented subsequence factor is stored in the ASRR.

In STEP 508, the remaining counters, WC 1, WC 2, and WRC, are set to their initial values before proceeding to STEP 510. Accordingly, WC 1 is set to WC 1=$W_j$, WC 2 is set to WC 2=$W_j$, and the WRC is set to WRC=WRR.

In STEP 510, procedure serveFlows is executed, which assembles and forwards a regular subsequence of packets. The serveFlows procedure is the same as described above in reference to FIG. 4.

In STEP 512, WC 1 and WC 2 are read to determine if at least one of WC 1 and WC 2 exceeds zero. When it is determined that at least one of WC 1 and WC 2 exceeds zero, the process proceeds to STEP 514. Otherwise, when it is determined that both WC 1 and WC 2 do not exceed zero, the process proceeds to STEP 526.

In STEP 514, the ASCC is read to determine whether the ASCC exceeds zero. When it is determined that the ASCC exceeds zero, the process proceeds to STEP 520. Otherwise, when it is determined that ASCC does not exceed zero, the process proceeds to STEP 516.

In STEP 516, the value of the WRC is restored to WRC=WRR. As discussed above, serveFlows may modify the WRC in STEP 510. In STEP 518, serveFlows is executed and a regular subsequence is assembled and forwarded. In response to forwarding a regular subsequence, the ASCC is decremented by one (STEP 520). After STEP 520, the process returns to STEP 512. Those skilled in the art, having the benefit of this detailed description, will appreciate that the process of FIG. 5 continuously repeats STEP 516, STEP 518, and STEP 520 until either the condition set forth in STEP 512 is false and when the ASCC exceeds one (STEP 514). Accordingly, the number of regular subsequences assembled and forwarded depends on the values of WC 1, WC 2, and the ASCC.

In STEP 522, the value of the WRC is restored to WRC=WRR+1. Further, the ASCC is restored to ASCC=ASRR. In STEP 524, serveFlows is executed and an augmented subsequence is assembled and forwarded. After STEP 524, the process returns to STEP 512. Those skilled in the art, having the benefit of this detailed description, will appreciate that the process of FIG. 5 continuously repeats STEP 522 and STEP 524 until the condition set forth in STEP 512 is false and when the ASCC does not exceed one (STEP 514). Those skilled in the art, having the benefit of this detailed description, will appreciate that the process of FIG. 5 generates a pattern of subsequences consisting of a set of regular subsequences with a cardinality equal to the value of the ASRR decremented by one (i.e., ASRR−1) followed by one augmented subsequence. In other words, every Nth forwarded subsequence is an augmented subsequence, where N is equal to the value of ASRR, and every other subsequence is a regular subsequence. This pattern of subsequences is assembled and forwarded until the condition set forth in STEP 512 is false. Those skilled in the art, having the benefit of this detailed description, will appreciate that the sequence of packets is essentially composed of multiple instances of this pattern of subsequences.

After STEP 512, the process returns to STEP 508. Alternatively, execution of the process may be ended (e.g., by a user) (i.e., STEP 526). In one or more embodiments of the invention, STEP 526 is omitted. In such embodiments, STEP 508 is immediately executed following STEP 512.

Those skilled in the art, having the benefit of this detailed description, will appreciate that the length of the sequence forwarded is equal $W_i+W_j$. Further, the sequence may be composed of $W_i$ packets from Flow i and $W_j$ packets from Flow j. Those skilled in the art, having the benefit of this detailed description, will appreciate that the last time serveFlows executes in STEP 520 or STEP 524 before the condition set forth in STEP 512 is false, the subsequence serveFlows forwards may be different from a regular subsequence or an augmented subsequence because of the constraints imposed on the length and composition of the sequence, as discussed above.

As discussed above, the values stored in registers and counters (e.g., WRR, ASCC) are based on values of two weights, $W_i$ and $W_j$, corresponding to two flows, Flow i and Flow j. Alternatively, in one or more embodiments of the invention, a greatest common divisor of the $W_i$ and $W_j$ may be obtained. In such embodiments, $W_i$ and $W_j$ may both be divided by the greatest common divisor of $W_i$ and $W_j$, the results stored in counters (e.g. WC 1 and WC 2). Subsequently, a sequence may be assembled according to the scheduling algorithm as discussed in reference to FIG. 3 and FIG. 5 based on the results stored in the counters instead of the original weights, $W_i$ and $W_j$. For example, if $W_i$=10 and $W_j$=4, then gcd($W_i$, $W_j$)=2 and WC 1 stores WC 1=$W_i$/gcd($W_i$, $W_j$)=10/2=5 and WC 2 stores WC 2=$W_j$/gcd($W_i$, $W_j$)=4/2=2. The scheduling algorithm will then assemble a sequence of length WC 1+WC 2=5+2=7. In such embodiments, the jitter of the two flows in the resulting sequence may be lower than the jitter of a resulting sequence assembled without initially dividing the two weights by the greatest common divisor of the two weights. In such embodiments, the greatest common divisor may be obtained by accessing a lookup table or by calculating the greatest common divisor directly.

In one or more embodiments of the invention, the WRR may be set to WRR=ceil($W_i/W_j$)=$\lceil W_i/W_j \rceil$ instead of WRR=floor($W_i/W_j$)=$\lfloor W_i/W_j \rfloor$, as discussed above in reference to FIG. 3 and FIG. 5. When WRR=ceil($W_i/W_j$)=$\lceil W_i/W_j \rceil$, regular subsequences may have one more packet from Flow i in comparison to when WRR=floor($W_i/W_j$)=$\lfloor W_i/W_j \rfloor$. Further, instead of having augmented subsequences as in the case that WRR=floor($W_i/W_j$)=$\lfloor W_i/W_j \rfloor$, when WRR=ceil($W_i/W_j$)=$\lceil W_i/W_j \rceil$, there exists decremented subsequences instead of augmented sequences. The decremented sequences include a number of packets from Flow i equal to WRR decremented by one (i.e., number of packets=WRR−1) and one packet from Flow j. The resulting sequence may be composed of regular subsequences and decremented subsequences and may have the same jitter for each scheduled flow as the resulting sequence in the case that WRR=floor($W_i/W_j$)=$\lfloor W_i/W_j \rfloor$.

The scheduling algorithm in FIG. 5 may achieve a jitter as low as the scheduling algorithm in FIG. 3. However, the scheduling algorithm in FIG. 5 interleaves augmented subsequences between regular subsequences while the algorithm in FIG. 3 assembles all the augmented subsequences in the beginning and then assembles all the regular subsequences. In addition to calculating the inter departure delay of a single packet in a given flow, an inter departure delay may also be calculated for a pair of packets in a given flow. For example, consider four packets A, B, C, and D, all from the same packet source, having the inter departure delays of 3,4,3, and 4, respectively. This first set of inter departure delays may be obtained by the scheduling algorithm in FIG. 5. The inter departure delay of a pair of packets is the sum of their individual inter departure delays of a given flow. Accordingly, pair {A, B} has an inter departure delay of 3+4=7; pair {B, C} has an inter departure delay of 4+3=7; pair {C, D} has an inter departure delay of 3+4=7; and pair {D, A} has an inter departure delay of 4+3=7.

Now consider four packets E, F, G, and H, all from the same packet source, having the inter departure delays of 4, 4, 3, and 3, respectively. This second set of inter departure delays may be obtained by the scheduling algorithm in FIG. 3. As discussed above, the inter departure delay of a pair of packets is the sum of their individual inter departure delays in a given flow. Accordingly, pair {E, F} has an inter departure delay of 4+4=8; pair {F, G} has an inter departure delay of 4+3=7; pair {G, H} has an inter departure delay of 3+3=6; and pair {H, E} has an inter departure delay of 3+4=7.

Those skilled in the art, having the benefit of this detailed description, will appreciate that the calculated jitter is the same for both sets (i.e., {A, B, C, D} and {E, F, G, H}) when considering only the individual inter departure delays of each packet. However, when considering the inter departure delays of each pair of packets, the calculated jitter is 0 for the first set (i.e., {A, B, C, D}) and 0.5 for the second set (i.e., {E, F, G, H}). Accordingly, in one or more embodiments of the invention, the scheduling algorithm in FIG. 5 results in a lower jitter measurement than the scheduling algorithm in FIG. 3.

FIG. 6 shows examples of the scheduling algorithms presented in FIG. 3 (i.e., Example 1 (610)) and in FIG. 5 (i.e., Example 2 (620)) in accordance with one or more embodiments of the invention. Both examples (610, 620) show the resulting sequence of packets from Flow i and packets from Flow j after executing the respective scheduling algorithm. As shown in Example 1 (610), the scheduler processes Flow i having weight $W_i$=10 and Flow j having weight $W_j$=4 according to the scheduling algorithm described in FIG. 3. The scheduler sets the WRR to WRR=floor($W_i/W_j$)=$\lfloor W_i/W_j \rfloor$=2, the scheduler sets the RR to RR=$W_i$-$W_j$×WRR=10-4×2=2, the scheduler sets the ASRR to ASRR=floor($W_j$/RR)=2, and the scheduler sets the ASCC to ASCC=ceil($W_i$/(WRR×ASCC+WRR+1))=ceil(10/(4+2+1))=ceil(10/7)=2. Further, the scheduler sets WC 1=$W_i$=10, WC 2=$W_j$=4, and the WRC=WRR=2. Now the scheduling algorithm of FIG. 3 will assemble and forward a regular subsequence, which is I I J. Subsequently, the scheduling algorithm of FIG. 3 will assemble a set of augmented subsequences with a cardinality equal to the ASCC=2, with each augmented subsequence being I I I J. Subsequently, the scheduling algorithm of FIG. 3 assembles and forwards one regular subsequence before the process terminates. The resulting sequence of packets is: I I J I I I J I I I J I I J. The inter departure delays of Flow i for the resulting sequence in Example 1 (610) are 1, 2, 1, 1, 2, 1, 1, 2, 1, and 2, while the inter departure delays of Flow j for the resulting sequence in Example 1 are 4, 4, 3, and 3. The jitter of Flow i is 0.49, whereas the jitter of Flow j is 0.50

As shown in Example 2 (620), the scheduler processes Flow i having weight $W_i$=10 and Flow j having weight $W_j$=4 according to the scheduling algorithm described in FIG. 5. The scheduler sets the WRR to WRR=floor($W_i/W_j$)=2, the scheduler sets the RR to RR=$W_i$-$W_j$×WRR=10-4×2=2, the scheduler sets the ASRR to ASRR=floor($W_j$/RR)=2, and the scheduler sets the ASCC to ASCC=floor($W_j$/RR)=2. Further, the scheduler sets the WC 1=$W_i$=10, the WC 2=$W_j$=4, and the WRC=WRR=2. Now the scheduling algorithm of FIG. 5 will assemble and forward a regular subsequence, which is I I J (i.e., I=packet from Flow i and J=packet from Flow j). Subsequently, the scheduling algorithm of FIG. 5 will assemble and forward a pattern of subsequences composed of a set of regular subsequences with a cardinality equal to ASRR-1=1 and one augmented subsequence. Each augmented subsequence in this example is I I I J. Accordingly, the pattern of subsequences is I I J I I I J. The resulting sequence of packets is: I I J I I I J I I I J I I J I. In one or more embodiments of the invention, the order of the pattern of subsequences may be switched, in that an augmented subsequence is assembled and forwarded before the regular subsequences. The inter departure delays of Flow i are: 1, 2, 1, 2, 1, 1, 2, 1, 2, and 1 whereas the inter departure delays of Flow j are: 3, 4, 3, and 4. The jitter of Flow i is 0.49 whereas the jitter of Flow j is 0.50.

Figure 7:
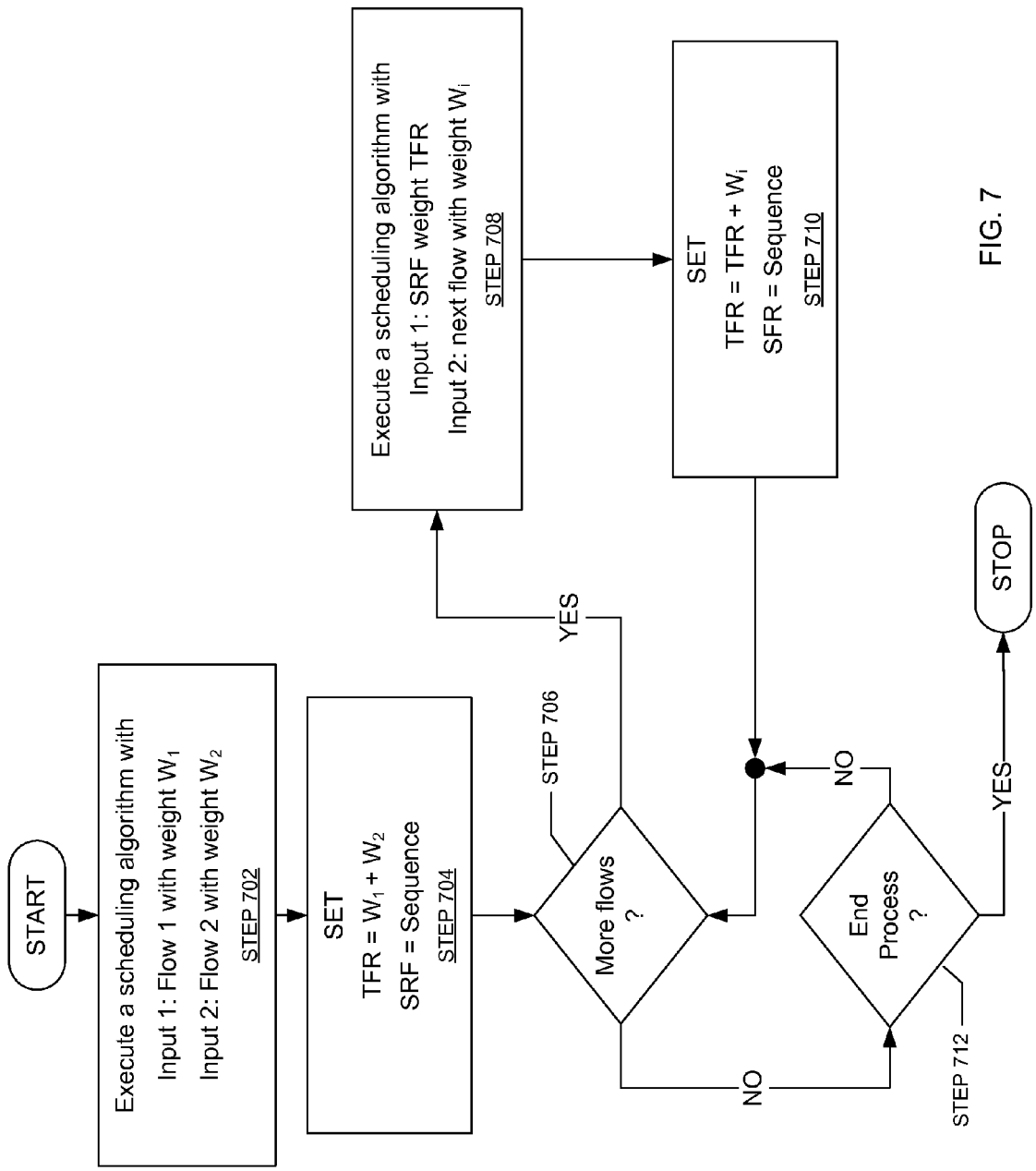
FIG. 7 shows flowcharts in accordance with one or more embodiments of the invention.

FIG. 7 shows a flowchart in accordance with one or more embodiments of the invention. The process shown in FIG. 7 may be an extension to the scheduling algorithms discussed above in reference to FIG. 3 and FIG. 5 to assemble and forward a sequence of packets for k flows having weights $W_1$, $W_2$ ... $W_k$, where k is greater than two. Those skilled in the art, having the benefit of this detailed description, will appreciate that the sequence of steps shown in FIG. 7 may differ among embodiments of the invention, and that one or more of the steps shown in FIG. 7 may be repeated or omitted.

In one or more embodiments of the invention, the process in FIG. 7 may set and modify the values of one or more counters (e.g., WC 1, WC 2, WRC, ASCC, DC). In one or more embodiments of the invention, the scheduling algorithm may store calculated values in registers (e.g., WRR, RR, ASRR, TWR) and register files (e.g., SRF).

Initially, the scheduling algorithm described in FIG. 3 or FIG. 5 is executed on two flows, Flow 1 and Flow 2 (STEP 702). In STEP 704, the value of the TWR is set to the total weight of Flow 1 and Flow 2, TWR=$W_1$+$W_2$, and the SRF is configured to store the instructions dictating the order in which the packets in flow queues corresponding to Flow 1 and Flow 2 are to be forwarded (i.e., the instructions are used to assemble the sequence of packets). In one of more embodiments of the invention, the sequence of packets may be stored in an internal queue.

In STEP 704, the scheduler determines whether there are more flows to schedule. If there are more flows to schedule, the process proceeds to STEP 708. Otherwise, if there are no more flows to schedule, the process proceeds to STEP 712.

In STEP 708, the scheduling algorithm described in FIG. 3 or FIG. 5 is executed on the sequence stored in the SRF with weight equal to the value of the TWR and a next flow to be scheduled with weight $W_i$. In other words, after scheduling the first pair of flows, the scheduler proceeds by taking the resulting sequence of the first pair of flows and scheduling the resulting sequence with another incoming flow. For example, once Flow 1 and Flow 2 have been scheduled, the resulting sequence of Flow 1 and Flow 2 is scheduled by the scheduling algorithm with another flow (e.g. Flow 3), assembling another sequence incorporating packets from Flow 3.

In STEP 710, the value of TWR is incremented by $W_i$. Further, the SRF is updated with the sequence resulting from the scheduling algorithm performed in STEP 708. After STEP 710, the process returns to STEP 706. Those skilled in the art, having the benefit of this detailed description, will appreciate that the process of FIG. 7 continuously repeats STEP 708 and STEP 710 until no more flows are left to be scheduled, as set forth in STEP 706. Accordingly, the scheduler recursively applies the scheduling algorithm in FIG. 3 or in FIG. 5 to its resulting sequence and another flow to assemble a final sequence incorporating packets from all flows that were scheduled.

After STEP 706, the process repeats STEP 706 again. Alternatively, execution of the process may be ended (e.g., by a user) (i.e., STEP 712). In one or more embodiments of the invention, STEP 712 is omitted. In such embodiments, STEP 706 is repeated indefinitely.

In one or more embodiments of the invention, additional flows may arrive at the scheduler at the same time as any of the steps in FIG. 7 are being processed. For example, if all flows from Flow 1 through Flow k have been scheduled and the process is repeating STEP 706, a new flow may arrive at the scheduler. Accordingly, the condition set forth in STEP 706 will switch from false to true and the scheduler will execute STEP 708 and STEP 710 with the new flow as an input to the scheduling algorithm executed in STEP 708. Accordingly, packets from new flows will be incorporated into the final resulting sequence as the new flows arrive.

Those skilled in the art, having the benefit of this detailed description, will appreciate the scheduling algorithm of FIG. 3, FIG. 5, and FIG. 7 may schedule a flow only once, thus performing the associated calculations only once. Once a sequence is assembled, the sequence may be stored in the SRF and subsequent packets from a flow may be forwarded according to the sequence stored in the SRF. In one or more embodiments of the invention, some or all of the calculations performed by the scheduling algorithm of FIG. 3, FIG. 5, and FIG. 7 are pre-calculated before packets from some or all flows (e.g., 120, 122, 124) arrive at the scheduler. In one or more embodiments of the invention, the sequences for various weight combinations, $W_i$ and $W_j$, can be pre-calculated (e.g., by a hardware processor external to the scheduler) and stored in a buffer (e.g., in the lookup table (280) or as vectors/arrays in a repository external to the scheduler) to be later accessed or loaded (e.g., into the SRF (230)) when flows arrive at the scheduler. Pre-calculated sequences for a subset of weight combinations stored in an external repository may be loaded into a buffer within the scheduler (e.g., in the lookup table (280)), depending on the expected weight ranges of packet sources the scheduler is to schedule.

FIG. 8 shows examples of the recursive application of scheduling algorithms presented in FIG. 3 in accordance with one or more embodiments of the invention. Three flows, Flow 1 with a weight $W_1=7$, Flow 2 with a weight $W_2=3$, and Flow 3 with a weight $W_3=5$ are being scheduled. After the scheduling algorithm in FIG. 3 schedules Flow 1 and Flow 2, the first resulting sequence is P1 P1 P2 P1 P1 P1 P2 P1 P1 P2 (i.e., P1=packet from Flow 1 and P2=packet from Flow 2). The SRF is set to store the order of packets in the first sequence (i.e., SRF=1, 1, 2, 1, 1, 1, 2, 1, 1, 2) and the TWR is set to the sum of the weights of Flow 1 and Flow 2 (i.e., TWR=$W_1+W_2$=10). The scheduler subsequently sets the WRR to WRR=floor($W_1/W_2$)=$\lfloor W_1/W_2 \rfloor$=2 and the RR to RR=$W_1-W_2 \times$WRR=10-4×2=2. Since RR=0, ASRR and ASCC remain at their initial values of 0. Since ASCC=0, the scheduling algorithm will not assemble any augmented subsequences but only a set of regular subsequences composed of two packets from the first sequence and one packet from Flow 3. Thus, the final sequence is P1 P1 P3 P2 P1 P3 P1 P1 P3 P2 P1 P3 P1 P2 P3 (i.e., P3=packet from Flow 3). In one or more embodiments of the invention, Flow 2 and Flow 3 may be scheduled first, and the resulting sequence of Flow 2 and Flow 3 may be subsequently scheduled with Flow 1.

Figure 9:
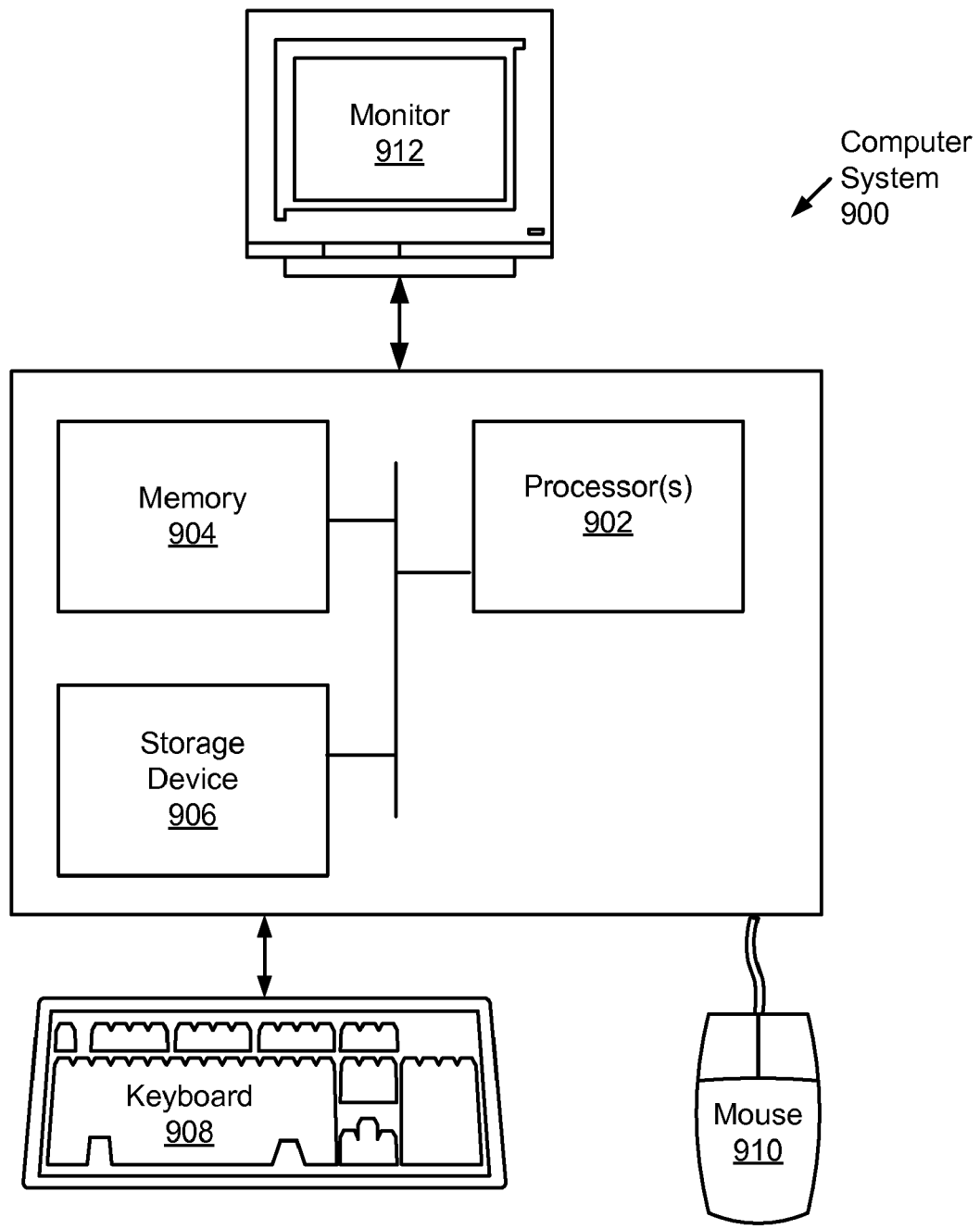
FIG. 9 shows a computer system in accordance with one or more embodiments of the invention.

FIG. 9 shows a computer system (900) in accordance with one or more embodiments of the invention. One or more portions of the invention may be a component in the computer system (900) (e.g., an integrated circuit in the computer system (900)). As shown in FIG. 8, the computer system (900) includes a processor (902), associated memory (904), a storage device (906), and numerous other elements and functionalities typical of today's computers (not shown). The computer system (900) may also include input means, such as a keyboard (908) and a mouse (910), and output means, such as a monitor (912). The computer system (900) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer system (900) may be located at a remote location and connected to the other elements over a network. Further, software instructions to perform embodiments of the invention may be stored on a non-transitory computer readable storage medium such as a compact disc (CD), a diskette, a tape, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing packets, comprising:
   identifying a first plurality of packets from a first packet source having a first weight;
   identifying a second plurality of packets from a second packet source having a second weight, wherein the first weight exceeds the second weight;
   obtaining a first weight ratio based on the first weight and the second weight;
   obtaining a first augmented subsequence factor based on the first weight and the second weight;
   assembling a first regular subsequence of packets using a first packet from the second packet source and a first set of packets from the first packet source, wherein the first set of packets has a cardinality equal to the first weight ratio;
   assembling a first augmented subsequence of packets using a second packet from the second packet source and a second set of packets from the first packet source, wherein the second set of packets has a cardinality equal to the first weight ratio plus one; and
   forwarding a first sequence of packets comprising a first set of regular subsequences including the first regular subsequence and a first set of augmented subsequences including the first augmented subsequence,
   wherein the first set of augmented subsequences has a cardinality based on the first augmented subsequence factor.

2. The method of claim 1, wherein the first sequence has a first number of packets from the first packet source and a second number of packets from the second packet source, and wherein the first number is the first weight and the second number is the second weight.

3. The method of claim 1, further comprising:
   calculating a first quotient by dividing the first weight by a greatest common divisor of the first weight and the second weight; and
   calculating a second quotient by dividing the second weight by the greatest common divisor of the first weight and the second weight,
   wherein the first weight ratio is further based on the first quotient and the second quotient, and
   wherein the first augmented subsequence factor is further based on the first quotient and the second quotient.

4. The method of claim 1, further comprising:
   calculating a total weight by summing the first weight and the second weight;

identifying a third plurality of packets from a third packet source having a third weight, wherein the total weight exceeds the third weight;

obtaining a second weight ratio based on the total weight and the third weight;

obtaining a second augmented subsequence factor based on the total weight and the third weight;

assembling a second regular subsequence of packets using a first packet from the third packet source and a first set of packets from the first sequence, wherein the first set of packets from the first sequence has a cardinality equal to the second weight ratio;

assembling a second augmented subsequence of packets using a second packet from the third packet source and a second set of packets from the first sequence, wherein the second set of packets from the first sequence has a cardinality equal to the second weight ratio plus one; and forwarding a second sequence of packets comprising a second set of regular subsequences including the second regular subsequence and a second set of augmented subsequences including the second augmented subsequence, wherein the second set of augmented subsequences has a cardinality based on the second augmented subsequence factor.

5. The method of claim 1, further comprising:
calculating a first remainder and a first quotient by dividing the first weight by the second weight; and
calculating a first floor of the first quotient,
wherein the first weight ratio is the first floor.

6. The method of claim 5, further comprising:
calculating a second quotient by dividing the second weight by the first remainder;
calculating a second floor of the second quotient,
wherein the first augmented subsequence factor is the second floor; and
assembling a pattern of subsequences comprising the first augmented subsequence and a subset of regular subsequences,
wherein the subset of regular subsequences has a cardinality equaling the first augmented subsequence factor minus one, and
wherein the first sequence comprises the pattern of subsequences.

7. The method of claim 5, wherein the cardinality of the first set of augmented subsequences equals the first augmented subsequence factor.

8. The method of claim 7, wherein the first augmented subsequence factor equals the first remainder.

9. The method of claim 7, further comprising:
calculating a second quotient by dividing the second weight by the first remainder;
calculating a second floor of the second quotient;
calculating a product of the first weight ratio multiplied by the second floor;
calculating a sum of the product and the first weight ratio incremented by one;
calculating a third quotient by dividing the first weight by the sum; and
calculating a ceiling of the third quotient,
wherein the first augmented subsequence factor is the ceiling.

10. A non-transitory computer readable storage medium comprising instructions for managing packets, the instructions comprising functionality for:
identifying a first plurality of packets from a first packet source having a first weight;

identifying a second plurality of packets from a second packet source having a second weight, wherein the first weight exceeds the second weight;

obtaining a weight ratio based on the first weight and the second weight;

obtaining an augmented subsequence factor based on the first weight and the second weight;

assembling a regular subsequence of packets using a first packet from the second packet source and a first set of packets from the first packet source, wherein the first set of packets has a cardinality equal to the weight ratio;

assembling an augmented subsequence of packets using a second packet from the second packet source and a second set of packets from the first packet source, wherein the second set of packets has a cardinality equal to the weight ratio plus one;

forwarding a sequence of packets comprising a set of regular subsequences including the regular subsequence and a set of augmented subsequences including the augmented subsequence, wherein the set of augmented subsequences has a cardinality based on the augmented subsequence factor.

11. The non-transitory computer readable storage medium of claim 10, the instructions further comprising functionality for:
calculating a first remainder and a first quotient by dividing the first weight by the second weight; and
calculating a first floor of the first quotient,
wherein the weight ratio is the first floor, and
wherein the cardinality of the set of augmented subsequences equals the augmented subsequence factor.

12. The non-transitory computer readable storage medium of claim 11, wherein the augmented subsequence factor equals the first remainder.

13. The non-transitory computer readable storage medium of claim 11, the instructions further comprising functionality for:
calculating a second quotient by dividing the second weight by the first remainder;
calculating a second floor of the second quotient;
calculating a product of the weight ratio multiplied by the second floor;
calculating a sum of the product and the weight ratio incremented by one;
calculating a third quotient by dividing the first weight by the sum; and
calculating a ceiling of the third quotient,
wherein the augmented subsequence factor is the ceiling.

14. The non-transitory computer readable storage medium of claim 11, the instructions further comprising functionality for:
calculating a first remainder and a first quotient by dividing the first weight by the second weight;
calculating a first floor of the first quotient, wherein the weight ratio is the first floor,
wherein the weight ratio is the first floor,
calculating a second quotient by dividing the second weight by the first remainder;
calculating a second floor of the second quotient,
wherein the augmented subsequence factor is the second floor; and
assembling at least one pattern of subsequences comprising one augmented subsequence and a subset of regular subsequences,
wherein the cardinality of the subset of regular subsequences equals to the augmented subsequence factor minus one, wherein at least one pattern of subsequences comprises the first augmented subsequence, and wherein the sequence comprises at least one pattern of subsequences.

15. A system for managing packets, comprising:
a first queue storing a plurality of packets from a first packet source with a first weight;
a second queue storing a plurality of packets from a second packet source with a second weight, wherein the first weight exceeds the second weight;
a weight ratio counter (WRC) configured to decrement in response to forwarding a packet from the first packet source; and
a sequence assembler operatively connected to the first queue, the second queue, the WRC, a weight ratio register (WRR), and an augmented subsequence coefficient counter (ASCC), wherein the sequence assembler comprises functionality to:
assemble a regular subsequence of packets using a first set of packets from the first queue and a first packet from the second queue, wherein the first set of packets has a cardinality equal to a value of the WRR;
assemble an augmented subsequence of packets using a second packet from the second queue and a second set of packets from the first queue, wherein the second set of packets has a cardinality equal to the value of the WRR plus one; and
forward a sequence of packets comprising a set of regular subsequences including the regular subsequence and a set of augmented subsequences including the augmented sequence, wherein the set of augmented subsequences has a cardinality based on the ASCC,
wherein the WRR is configured to restore the WRC to the value of the WRR before forwarding the regular subsequence and to restore the WRC to the WRR plus one before forwarding the augmented subsequence.

16. The system of claim 15, further comprising:
a division counter configured to increment by the second weight in response to incrementing the WRR;
wherein the sequence assembler calculates a value for storage in the WRR by setting the division counter to zero, setting the WRR to one, and incrementing the WRR by one until the division counter exceeds the first weight.

17. The system of claim 15, wherein the sequence has a first number of packets from the first packet source and a second number of packets from the second packet source, wherein the first number is the first weight and the second number is the second weight.

18. The system of claim 15, further comprising:
a lookup table storing a greatest common divisor of the first weight and the second weight,
wherein the sequence assembler is further configured to divide the first weight by the greatest common divisor before setting the ASCC, and
wherein the sequence assembler is further configured to divide the second weight by the greatest common divisor before setting the ASCC.

19. The system of claim 15, wherein the sequence assembler further comprises functionality to:
calculate a remainder of the first weight divided by the second weight;
calculate a first quotient by dividing the first weight by the second weight; and
calculate a first floor of the first quotient, and set the WRR to the first floor.

20. The system in claim 19, further comprising:
an augmented subsequence rate register (ASRR) configured to reset the ASCC after a set of regular subsequences is forwarded,
wherein the cardinality of the set of regular subsequences equals to the value stored in the ASRR minus one,
wherein the ASCC is configured to decrement in response to forwarding the first regular subsequence,
wherein the sequence assembler further comprises functionality to:
calculate a second quotient of the first weight divided by the remainder;
calculate the second floor of the second quotient;
set the ASRR to the second floor; and
forward the augmented subsequence when the ASCC equals one.

* * * * *

UNITED STATES PATENT AND TRADEMARK OFFICE
CERTIFICATE OF CORRECTION

PATENT NO. : 8,385,358 B2
APPLICATION NO. : 12/982585
DATED : February 26, 2013
INVENTOR(S) : Olesinski et al.

Page 1 of 1

It is certified that error appears in the above-identified patent and that said Letters Patent is hereby corrected as shown below:

In the Specifications:

In column 4, line 55, delete "2." and insert -- 2, --, therefor.

In column 5, line 54, delete "$W_j$" and insert -- $W_i$ --, therefor.

In column 5, line 55, delete "to" and insert -- to $W_j$. --, therefor.

In column 6, line 35, delete "($W_i$/RR)" and insert -- ($W_j$/RR) --, therefor.

In column 8, line 8, delete "316." and insert -- STEP 316. --, therefor.

In column 9, line 13, delete "such" and insert -- $W_j$, such --, therefor.

In column 11, line 8, delete "$W_j$," and insert -- $W_i$, --, therefor.

In column 12, line 19, delete "the" and insert -- and the --, therefor.

In column 13, line 51, delete "0.50" and insert -- 0.50. --, therefor.

Signed and Sealed this
Fourth Day of June, 2013

Teresa Stanek Rea
*Acting Director of the United States Patent and Trademark Office*